US008952980B2

(12) United States Patent
Hansen et al.

(10) Patent No.: US 8,952,980 B2
(45) Date of Patent: Feb. 10, 2015

(54) ELECTRONIC COLOR AND LUMINANCE MODIFICATION

(75) Inventors: Ronald L. Hansen, San Jose, CA (US); Jerome Truppa, Magalia, CA (US); Amir Baghdadi, Gilroy, CA (US)

(73) Assignee: GSI Group, Inc., Bedford, MA (US)

( * ) Notice: Subject to any disclaimer, the term of this patent is extended or adjusted under 35 U.S.C. 154(b) by 310 days.

(21) Appl. No.: 13/051,962

(22) Filed: Mar. 18, 2011

(65) Prior Publication Data

US 2012/0032971 A1 Feb. 9, 2012

Related U.S. Application Data

(60) Provisional application No. 61/372,059, filed on Aug. 9, 2010.

(51) Int. Cl.
G09G 5/02 (2006.01)
(52) U.S. Cl.
CPC .............. G09G 5/02 (2013.01); *G09G 2340/06* (2013.01)
USPC ............................ 345/590; 345/589; 345/591
(58) Field of Classification Search
CPC combination set(s) only.
See application file for complete search history.

(56) References Cited

U.S. PATENT DOCUMENTS

| 7,027,113 | B2 | 4/2006 | Kim et al. | |
|---|---|---|---|---|
| 7,038,186 | B2 | 5/2006 | De Brabander et al. | |
| 7,068,333 | B2 | 6/2006 | Ohashi et al. | |
| 7,445,344 | B2 | 11/2008 | Lang et al. | |
| 7,508,387 | B2 | 3/2009 | Coley et al. | |
| 7,618,147 | B2 | 11/2009 | Defever et al. | |
| 8,004,488 | B2 | 8/2011 | Park | |
| 2002/0190972 | A1 | 12/2002 | Ven de Van | |
| 2003/0006980 | A1 | 1/2003 | Brabander et al. | |
| 2003/0197817 | A1 | 10/2003 | Class-Dieter et al. | |
| 2004/0017337 | A1 | 1/2004 | Lin | |
| 2004/0032588 | A1* | 2/2004 | Taylor et al. | 356/402 |
| 2004/0119908 | A1 | 6/2004 | Sakai | |
| 2005/0099431 | A1* | 5/2005 | Herbert et al. | 345/601 |
| 2005/0190136 | A1 | 9/2005 | Edelbrock | |
| 2006/0132403 | A1 | 6/2006 | Maximus et al. | |

(Continued)

FOREIGN PATENT DOCUMENTS

| CN | 1848227 | 10/2006 |
|---|---|---|
| CN | 101295084 A | 10/2008 |

(Continued)

OTHER PUBLICATIONS

Ford, Adrian, and Alan Roberts. "Colour space conversions." Westminster University, London 1998 (1998): 1-31.*

(Continued)

*Primary Examiner* — Ulka Chauhan
*Assistant Examiner* — Schiller Hill
(74) *Attorney, Agent, or Firm* — Shay Glenn LLP

(57) ABSTRACT

Systems and methods for transforming and displaying a video signal on a display are provided with any number of features. In some embodiments, system is configured to receive a first set of input signals in a controller. The system can determine in the controller a first set of luminances and colors that would be produced on a first display with the first set of input signals. The system can then determine in the controller a second set of luminances that would produce the first set of colors on a second display. The system can then generate in the controller a second set of input signals that would produce the second set of luminances on the second display, and can output the second set of input signals to the second display.

23 Claims, 9 Drawing Sheets

(56) References Cited

U.S. PATENT DOCUMENTS

| | | |
|---|---|---|
| 2006/0203795 A1 | 9/2006 | Welborn et al. |
| 2006/0262224 A1* | 11/2006 | Ha et al. ............ 348/582 |
| 2007/0126353 A1 | 6/2007 | Kubota et al. |
| 2007/0211074 A1 | 9/2007 | Yeung |
| 2007/0268241 A1 | 11/2007 | Nitta et al. |
| 2007/0279727 A1 | 12/2007 | Gandhi et al. |
| 2008/0078921 A1 | 4/2008 | Yang et al. |
| 2008/0094426 A1 | 4/2008 | Kimpe |
| 2008/0152219 A1* | 6/2008 | Ramanath et al. ........ 382/162 |
| 2008/0204469 A1 | 8/2008 | Jaspers |
| 2008/0246871 A1 | 10/2008 | Kupper et al. |
| 2009/0303410 A1 | 12/2009 | Murata et al. |
| 2011/0063341 A1 | 3/2011 | Knicely et al. |

FOREIGN PATENT DOCUMENTS

| | | |
|---|---|---|
| EP | 1445643 A1 | 8/2004 |
| EP | 1705708 A2 | 9/2006 |
| JP | 8-122726 | 5/1996 |
| JP | 9-210855 | 8/1997 |
| JP | 10-229499 | 8/1998 |
| JP | 11-201865 | 7/1999 |
| KR | 20090065940 | 6/2009 |
| WO | WO2005/050614 | 6/2005 |

OTHER PUBLICATIONS

Fetterly et al.; Introduction to grayscale calibration and related aspects of medical imaging grade liquid crystal displays; J Digit Imaging; 21(2):193-207; Jun. 2008.

\* cited by examiner

ELECTRONIC COLOR AND LUMINANCE MODIFICATION

CROSS REFERENCE TO RELATED APPLICATIONS

This application claims the benefit under 35 U.S.C. 119 of U.S. Provisional Patent Application No. 61/372,059, filed Aug. 9, 2010, titled "Electronic Color and Luminance Modification". This application is herein incorporated by reference in its entirety.

INCORPORATION BY REFERENCE

All publications, including patents and patent applications, mentioned in this specification are herein incorporated by reference in their entirety to the same extent as if each individual publication was specifically and individually indicated to be incorporated by reference.

FIELD OF THE INVENTION

The present invention relates generally to imaging devices used in medicine as well as hospitals and clinics. More specifically, the present invention relates to color and luminance correction in imaging displays.

BACKGROUND

Displays, such as LCD, plasma, OLED, CRT, or based on other types of technologies, are all subject to manufacturing tolerances and intentional variations in their color attributes. For example, many of today's color monitors are designed to render "white" at a color temperature of about 6500° K, whereas LCD TV displays can be designed to render "white" at a color temperature of about 10,000° K. The appearance of white on an LCD TV can therefore appear "bluer" than white on a monitor, even if they are presented and driven with the same electronic input signal.

Creating accurate color images on a display is especially important in broadcast, graphics, and medical applications. These applications depend on accurate and consistent color image rendition to assess a scene composition or the results of hard-copy printing, or to determine the health of a patient. For example, subtle differences in the colors in an image may establish the level of appeal of a scene or the level of oxygen in ones blood.

Most display images are created by mixing together various combinations of red, green, and blue light. These three colors are considered to be the display's primary colors. If the precise color of these primaries can vary from display to display, the result of mixing two or more of these primaries together will be variable as well. Therefore, for repeatable image creation, consistency and repeatability in generating the primaries need to be established.

The techniques used for manufacture of displays with repeatable primaries have improved significantly over time. Internationally recognized color standards have been developed that define color primaries. Nevertheless, because of the display manufacturers' need to produce displays economically and efficiently, there remain color differences between manufacturing lots, between display models from the same manufacturer, and between manufacturers themselves.

FIG. 1 illustrates a color capability, or color gamut chart, which provides a graphical representation of the colors a display can produce and is graphically represented on an x,y chart. Possible colors that a specific display can produce are contained within triangular area 100 as shown in FIG. 1. The vertices 102, 104, and 106 of triangle 100 represent points within the red, green, and blue color regions of the color gamut chart, for example. The horseshoe shaped region 108 in FIG. 1 illustrates the entire color spectrum that can be seen by a human being. Any colors outside of triangle area 100 within horseshoe shaped region 108 may not be produced by the display. Each display color is created upon receipt of an input electronic signal which contains information (data) about the relative amounts of the three primaries; in this case, red, green, and blue. If a second display has primaries whose colors differ from a first display, the second display's resultant color (and image, graphic, or video appearance) will differ as well. Minor primary differences will yield minor resultant color differences, but since the human eye is extremely sensitive to color variations, the differences will frequently be noticeable, especially to those with professional experience and training.

Previous methods of modifying an electronic input to a display so that its resultant colors match those of a standard display include the following. In FIG. 2, $r_{in}$, $g_{in}$, and $b_{in}$ represent input signals of a display. Signal gain and/or offset circuits for red, green, or blue can be adjusted (e.g., manually adjusted) to produce $r_{out}$, $g_{out}$, $b_{out}$ such that when input to the display, its color will match that of a standard display. Although a specific resultant color within the gamut can be matched, the entire gamut may not be matched with this technique.

FIG. 3 illustrates another prior method for modifying an input, including modifying red, green, and blue signals with a 3×3 matrix multiplication. This method is broadly used to translate signals from one color space to another (e.g., from RGB to YUV and vice-versa). However, since "a" through "i" are constants, the transform is linear but does not produce a revised gamut that simultaneously retains a consistent display luminance. Values for "a" through "i" that vary as a function of $r_{in}$, $g_{in}$, $b_{in}$ are desired, but may be difficult to determine.

Another prior method for modifying an input includes using large Look Up Tables (LUTs) where every $r_{in}$, $g_{in}$, $b_{in}$ combination is represented by a corresponding corrected $r_{out}$, $g_{out}$, $b_{out}$. While the output data may be exact, the memory required, as well as the access speed, may become prohibitive. This is especially so as input color depth grows from 24-bit to 30-bit and beyond. For example, the memory required for a 24-bit LUT must be greater than 400 Mb and have an access time less than 8 ns (to drive a 1080 p display). For a 30-bit color depth, the memory size grows to more than 32 Gb.

Therefore, novel methods are needed to modify an electronic input to a display so that the resultant colors will match those of a "standard" display.

SUMMARY OF THE INVENTION

In one embodiment, a method of displaying a standardized color gamut on a display is provided, comprising: 1) calculating a first set of luminances that would be produced on a first display when driven by a first set of input signals; 2) calculating a first set of colors that would be produced on the first display when driven by the first set of input signals; 3) calculating a second set of luminances that would produce the first set of colors calculated in step 2) on a second display; and 4) calculating a second set of input signals that would produce the second set of luminances calculated in step 3) on the second display when used as an input to the second display.

In some embodiments, the first display is a BT.709 display. In other embodiments, the first display is a SMPTE-C display.

In some embodiments of the method, steps 1 through 4 are performed in a controller. In one embodiment, the controller is a separate piece of hardware from the second display.

In one embodiment, the first set of input signals comprise red, green, and blue input signals. In another embodiment, the first set of luminances calculated in step 1 comprise a set of red, green, blue, and white luminances.

In some embodiments of the method, the first and second displays comprising a plurality of pixels, wherein steps 1-4 are repeated for each pixel in the second display.

In some embodiments, the first display is a standardized display and the second display is a non-standardized display.

Another method of displaying a standardized color gamut on a display is provided, comprising: receiving a first set of input signals in a controller; determining in the controller a first set of luminances and colors that would be produced on a first display with the first set of input signals; determining in the controller a second set of luminances that would produce the first set of colors on a second display; generating in the controller a second set of input signals that would produce the second set of luminances on the second display; and outputting the second set of input signals to the second display.

In some embodiments, the first display is a BT.709 display. In other embodiments, the first display is a SMPTE-C display.

In one embodiment, the first set of input signals comprise red, green, and blue input signals. In another embodiment, the first set of luminances comprise a set of red, green, blue, and white luminances.

In some embodiments of the method, the first and second displays comprising a plurality of pixels, wherein the method steps are repeated for each pixel in the second display.

In some embodiments, the first display is a standardized display and the second display is a non-standardized display.

A system for transforming and displaying a video signal is provided, comprising: a video signal source; an electronic display; and a controller comprising an input circuit configured to receive an input from the video signal source and an output circuit configured to send an output to the electronic display, the controller further comprising a processing circuit configured to: receive a first set of input signals from the video signal source; determine a first set of luminances and colors that would be produced on a target display with the first set of input signals, determine a second set of luminances that would produce the first set of colors on the electronic display, generate a second set of input signals that would produce the second set of luminances on the electronic display, and output the second set of input signals to the electronic display.

In some embodiments, the first display is a BT.709 display. In other embodiments, the first display is a SMPTE-C display. In another embodiment, the first display is a standardized display and the second display is a non-standardized display.

In one embodiment, the first set of input signals comprise red, green, and blue input signals. In another embodiment, the first set of luminances comprise a set of red, green, blue, and white luminances.

DETAILED DESCRIPTION OF THE INVENTION

Figure 1:
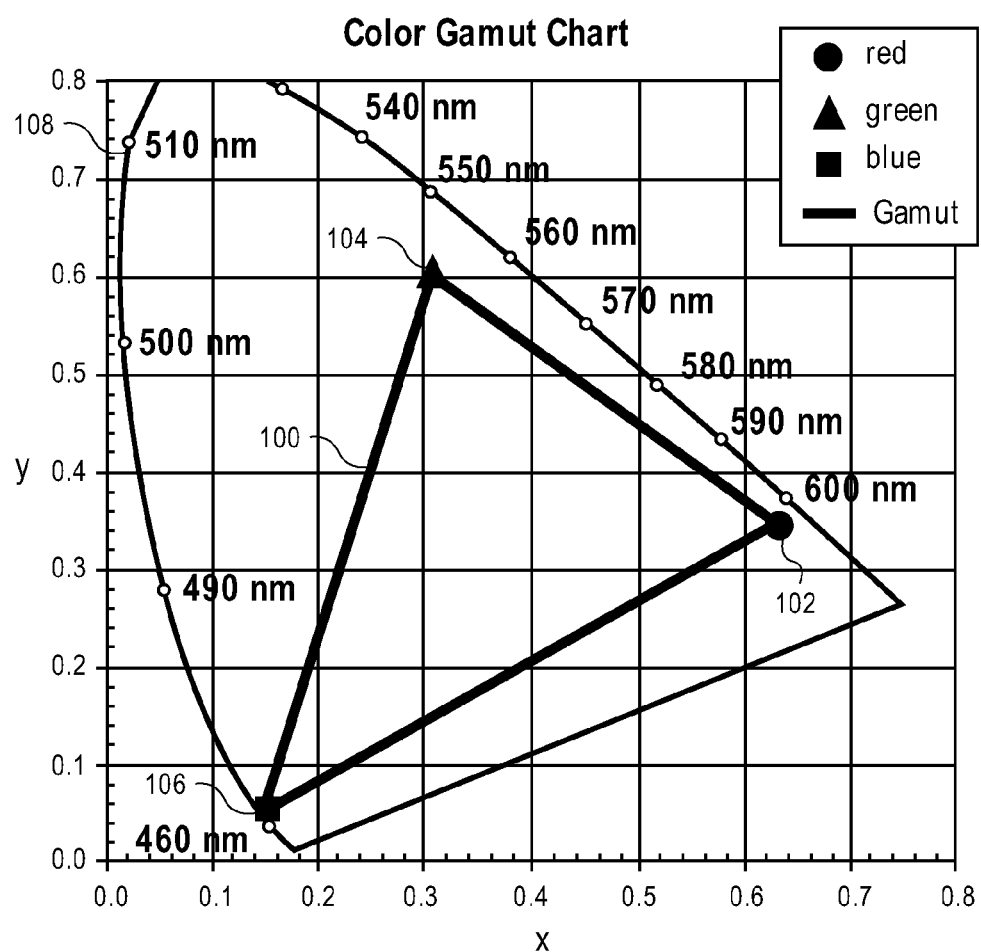
FIG. 1 illustrates a color gamut chart showing possible colors that a specific display can produce.
Figure 2:
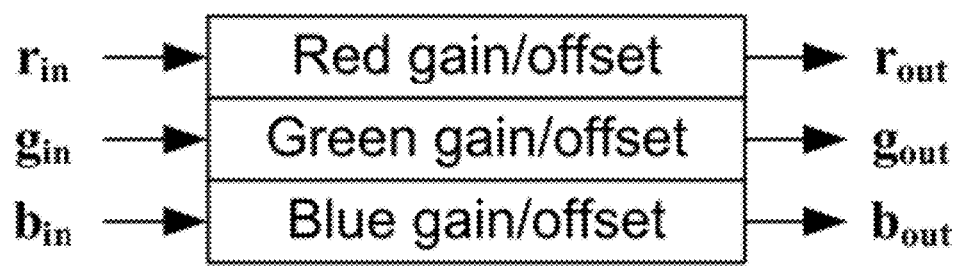
FIG. 2 illustrates one method of modifying an electronic display input to match the resultant colors to the display.
Figure 3:
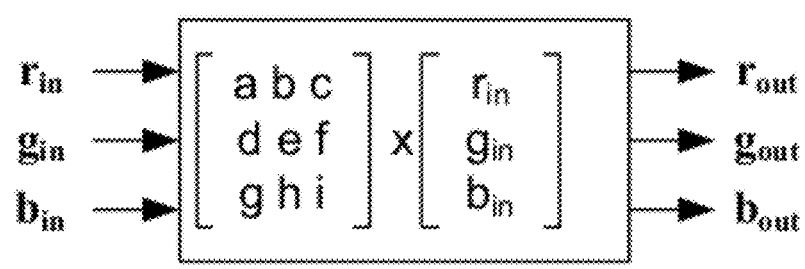
FIG. 3 illustrates another method of modifying an electronic display input to match the resultant colors to the display.

One embodiment includes a method of electronically changing colors produced by a display that corresponds to a recognized or established color standard. The method may be implemented such that correction of a color gamut can be accomplished in real time, thereby allowing a display to conform to various standards. The desired standard may be selected by a display user. The standard may be an arbitrary color gamut or a specific known standard. The method allows for a display to be periodically re-calibrated, either externally or internally.

Another embodiment is a method that enables an image, graphic, video and/or data to be reproduced identically on many separate displays. The displays may be identical or different in function and attributes. For example, methods described herein may enable a clinician to go into different rooms and view the same image reproduced identically on multiple displays.

Another embodiment allows a clinician to view images, graphics, videos and/or data in a visually proper manner. Accordingly, a display's color space may be modified and white point may be modified in an image, graphic, and video.

Another embodiment provides a method allowing enhanced viewing of human organs, body parts or body functions in a particular color space. For example, color addition, enhancement, or correction in an image may indicate a level of oxygen in ones blood.

Yet another embodiment provides a method of selecting a particular color space to view images, graphics, videos and data in that color space.

Accordingly, one aspect of the invention is a real-time method to modify an electronic input to a display so that the resultant colors match those of a "golden" or reference display, or alternatively, the colors of a recognized standard. The input signal modification may be based on both the standard and the actual display color primaries.

There are several areas in the surgical image pipeline (from image acquisition to display, from site to site, and through an image storage and retrieval process) where standardization of a color gamut can be applied. The standardized color gamut may additionally be customized to a display firmware specific to a surgical procedure (e.g., lapro, GI, arthro, etc.). Color settings for specific modalities in a surgical pipeline may be standardized. The color standardization may be made retrievable from the user controls or remotely. The color standardization may allow input descriptions to be renamed as a modality. When an input is defined as a modality, auto-select may be used for the pre-stored modality configuration when the modality input is selected.

Moreover, standardized display-to-display color consistency is important in clinical settings. The color consistency can be utilized in surgery to surgery settings. Color settings may be normalized in all surgical displays to a "standard" color gamut. BT.709, SMPTE-C, Adobe RGB, and NTSC are a few examples of specific types of industry standards that define red, green, blue, white, and gamma values. Luminance may be normalized in all surgical displays to a "standard" luminance (e.g., 400 cd/m$^2$).

The color consistency may also be utilized in surgical displays that can standardize the LCD panels inside. The color consistency may also be utilized in surgery to radiology (color displays) settings. Standardization between surgical images and color radiology images is also important. New DICOM standards may be required for color standardization.

The color and luminance adjustment and other methods shown in this application may be applied to standardization.

In one embodiment, a method of adjusting color can include a gamma transform adjustment to produce "standard" colors on a non-standard or "target" display. This color adjustment method may be used to calculate, in real-time, a corrected set of red, green, and blue values for output to a display. The calculation may be based on display measurements, on which all of the resulting calculations can be derived. A set of formulas, as illustrated in FIG. 4 and FIG. 5, can achieve this goal, and the calculations can be based on obtained parametric measurements.

Figure 4:
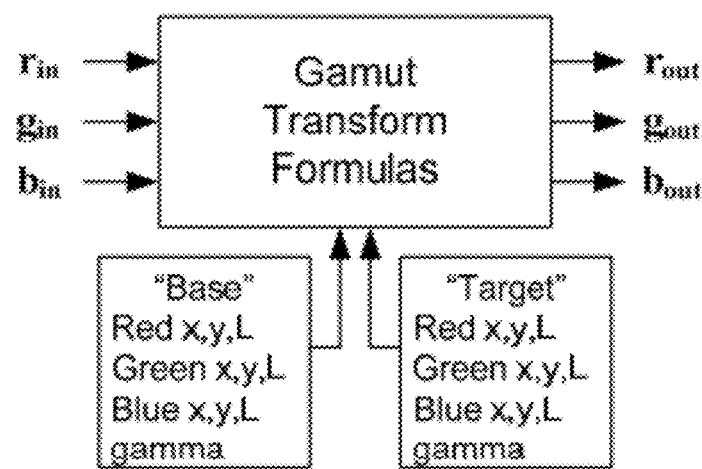
FIGS. 4 and 5 illustrate methods and formulae for adjusting color and luminance of a display.
Figure 5:
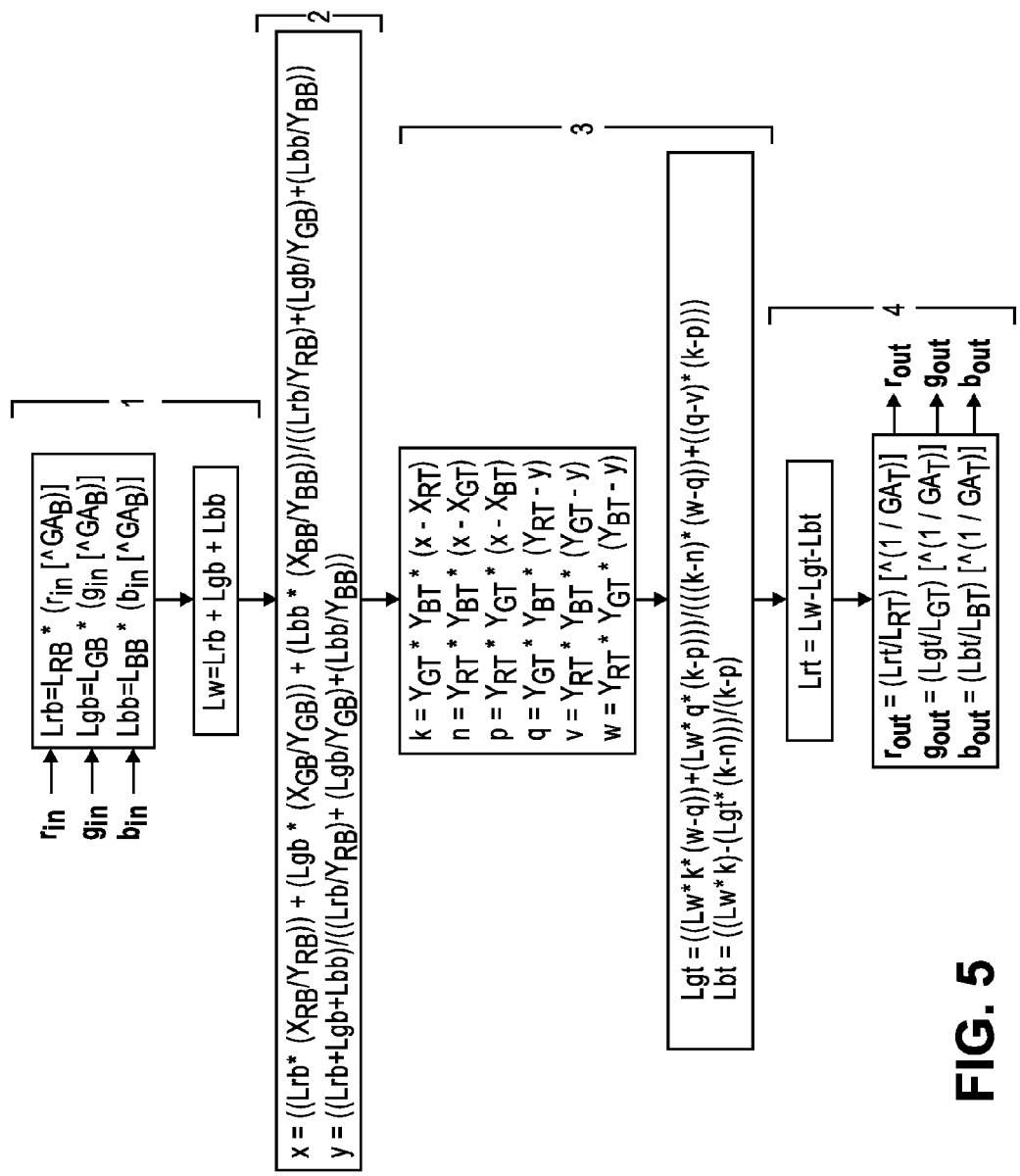

FIG. 4 illustrates the general concept of one embodiment of the invention that a set of $r_{in}$, $g_{in}$, $b_{in}$ inputs can produce a set of "base" $r_{out}$, $g_{out}$, $b_{out}$ outputs if the inputs are unaltered, but alternatively, can produce a set of "target" $r_{out}$, $g_{out}$, $b_{out}$ outputs if the inputs are transformed according to some desired or calculated "standard" color gamut. This technique will be further described with respect to FIG. 5 and the description below.

One embodiment of a color correction method is outlined in the following steps: Referring now to FIG. 5, the first step of the method, (labeled as equations "1" in FIG. 5) comprises calculating the red, green, blue, and white (the sum of red, green, and blue) luminances that would be produced on a "standard" display when driven by a specific input signal. In FIGS. 4 and 5, $r_{in}$, $g_{in}$, and $b_{in}$ represent an input signal to the display. $GA_B$ represents the gamma of a standard display. Gamma is an exponent of the relationship between a display's input signal and the resultant luminance. Other variables in the first step are defined below in Table 1. In particular, a red, green, blue input signal is raised to a power of gamma, which is then multiplied by a color luminance (i.e., red luminance, green luminance, blue luminance). $L_{rb}$, $L_{gb}$, and $L_{bb}$ represent the amount of red, green, blue light respectively. $L_w$ represents the overall brightness.

Step two of the method (labeled as equations "2" in FIG. 5) comprises calculating the color that would be produced on a "standard" display when driven by the specific input signal (i.e., $r_{in}$, $g_{in}$, and $b_{in}$). The color can be represented in x,y (CIE 1931) or u,v (CIE 1960), or u',v' (CIE 1976) color spaces. The x, y (or other counterparts) represent unique color values within a color gamut, as provided in FIG. 1.

Step three of the method (labeled as equations "3" in FIG. 5) can comprise calculating the luminances of red, green, and blue of the "target" display that will yield the same "standard" color calculated in step two. The values of k, n, p, q, v and w are intermediate values calculated in accordance with the variables shown in Table 1 and described above. $L_{rt}$, $L_{gt}$, $L_{bt}$ represent the amount of red, green, blue light respectively of a target display.

The fourth step (labeled as 4 in FIG. 5) can comprise calculating $r_{out}$, $g_{out}$, and $b_{out}$ signals that would produce the luminances in the "target" display that were calculated in step three. Since the unique luminances and color of the "standard" display are known, the formulas in this method can be used to inversely determine how to adjust a specific red, green, blue input to produce a "standard" color and luminance on a non-standard or "target" display.

These four steps are shown in detail in the formula flow chart (FIG. 5). In the formulas shown in FIG. 5, the values are either measureable or are determined from recognized standards.

TABLE 1

| Standard (or "Base" display): Primary colors: | |
|---|---|
| Red Luminance: | $L_{RB}$ |
| Red x: | $X_{RB}$ |
| Red y: | $Y_{RB}$ |
| Green Luminance: | $L_{GB}$ |
| Green x: | $X_{GB}$ |
| Green y: | $Y_{GB}$ |
| Blue Luminance: | $L_{BB}$ |
| Blue x: | $X_{BB}$ |
| Blue y: | $Y_{BB}$ |
| Gamma: | $GA_B$ |
| Target Display: Primary colors: | |
| Red Luminance: | $L_{RT}$ |
| Red x: | $X_{RT}$ |
| Red y: | $Y_{RT}$ |
| Green Luminance: | $L_{GT}$ |
| Green x: | $X_{GT}$ |
| Green y: | $Y_{GT}$ |
| Blue Luminance: | $L_{BT}$ |
| Blue x: | $X_{BT}$ |
| Blue y: | $Y_{BT}$ |
| Gamma: | $GA_T$ |

Figure 6A:
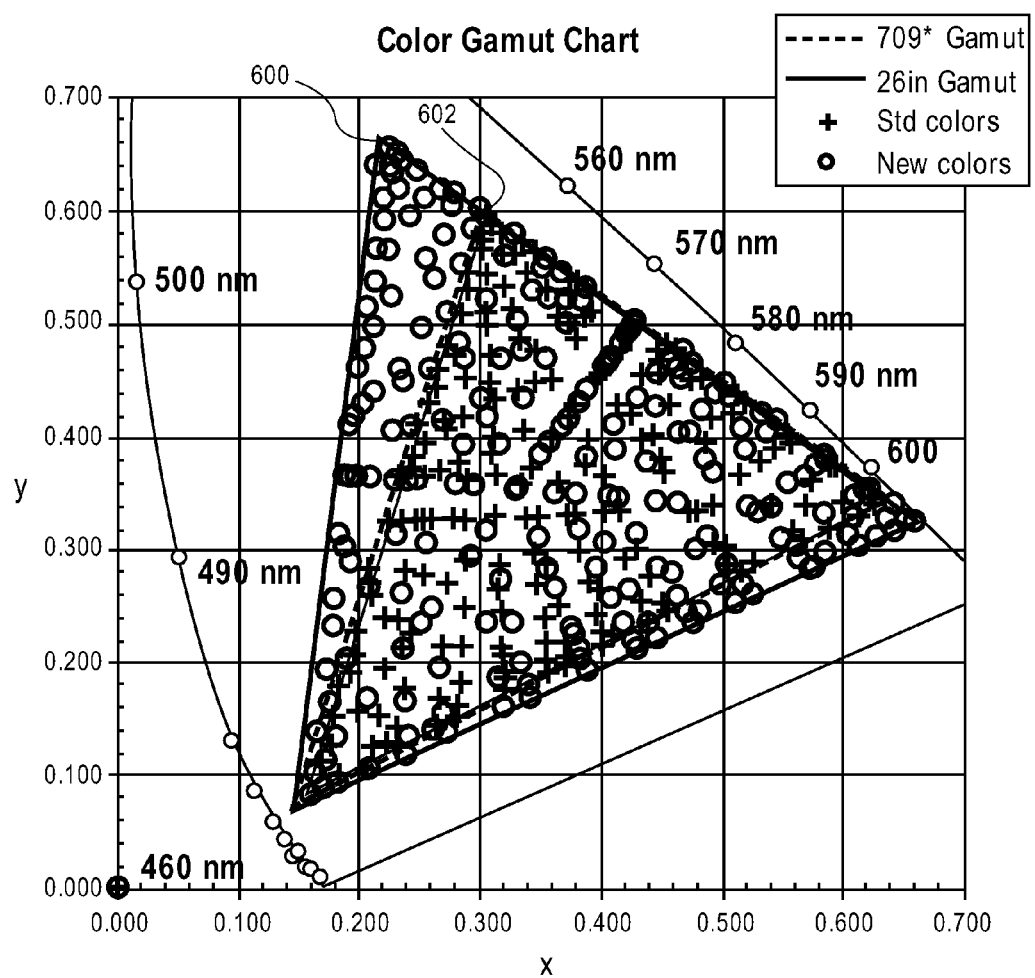
FIGS. 6A and 6B illustrate a correction effect in a color gamut chart based on color and luminance correction.
Figure 6B:
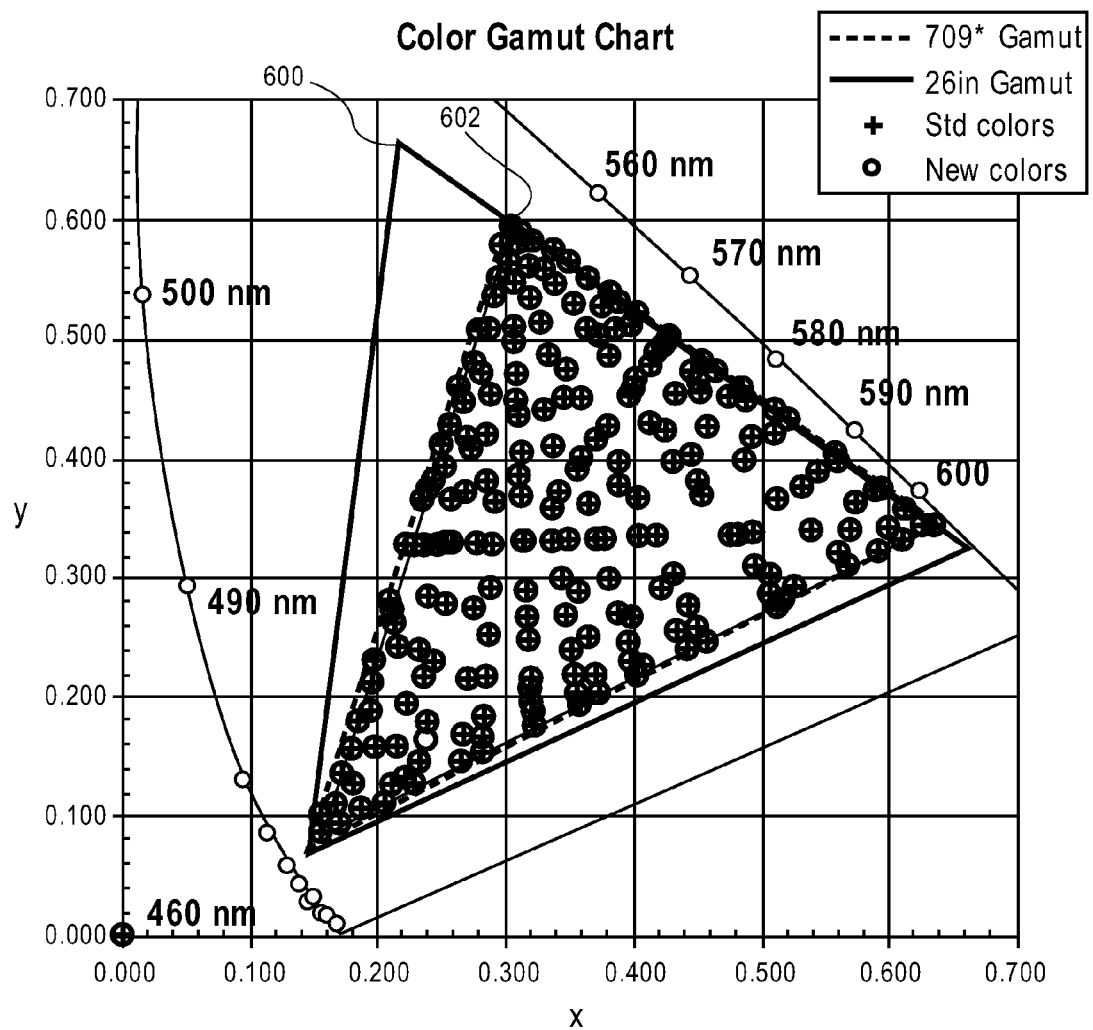

The correction effect based on the color and luminance adjustment method is illustrated in FIG. 6A and FIG. 6B. FIG. 6A is without the adjustment while FIG. 6B is with the adjustment. FIG. 6A illustrates that without correction, various combinations of red, green, and blue produce resultant colors that fill the gamut of a "target" display. These are represented by the white "O" in triangle 600 of FIG. 6A. The combinations of red, green, and blue in a "standard" panel are shown by the black "+" in triangle 602 of FIG. 6A. When the color adjustment correction method described above is applied to the red, green and blue inputs of the "target" panel (FIG. 6B), the resultant colors shift to match exactly those of the "standard" panel. The matching is illustrated by the superimposition of "O" on "+" (e.g., by shifting triangle 600 of FIG. 6A to match triangle 602 of FIG. 6A). Magnified sections of the above charts show the correction effect in more detail in FIGS. 7A and 7B.

Figure 7A:
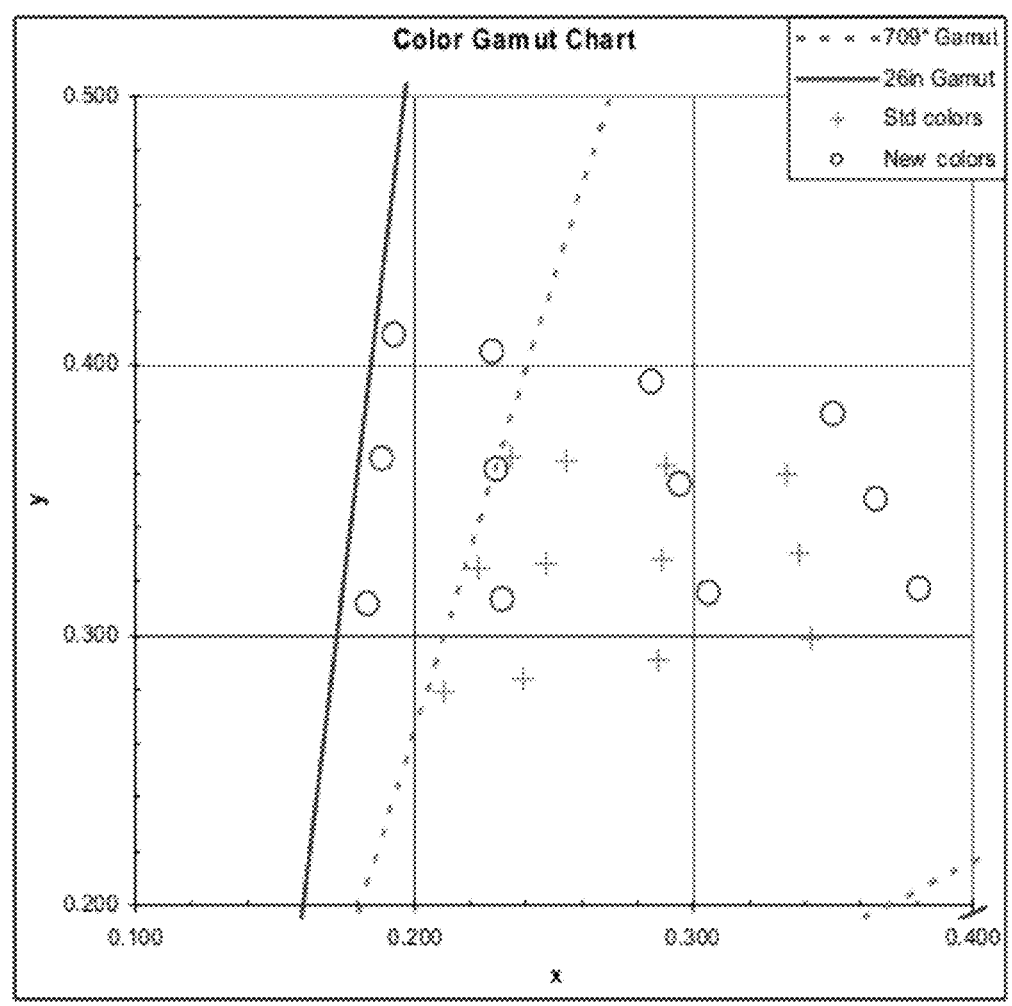
FIGS. 7A and 7B are detailed, close-up views of the correction effect described in FIGS. 6A-6B.
Figure 7B:
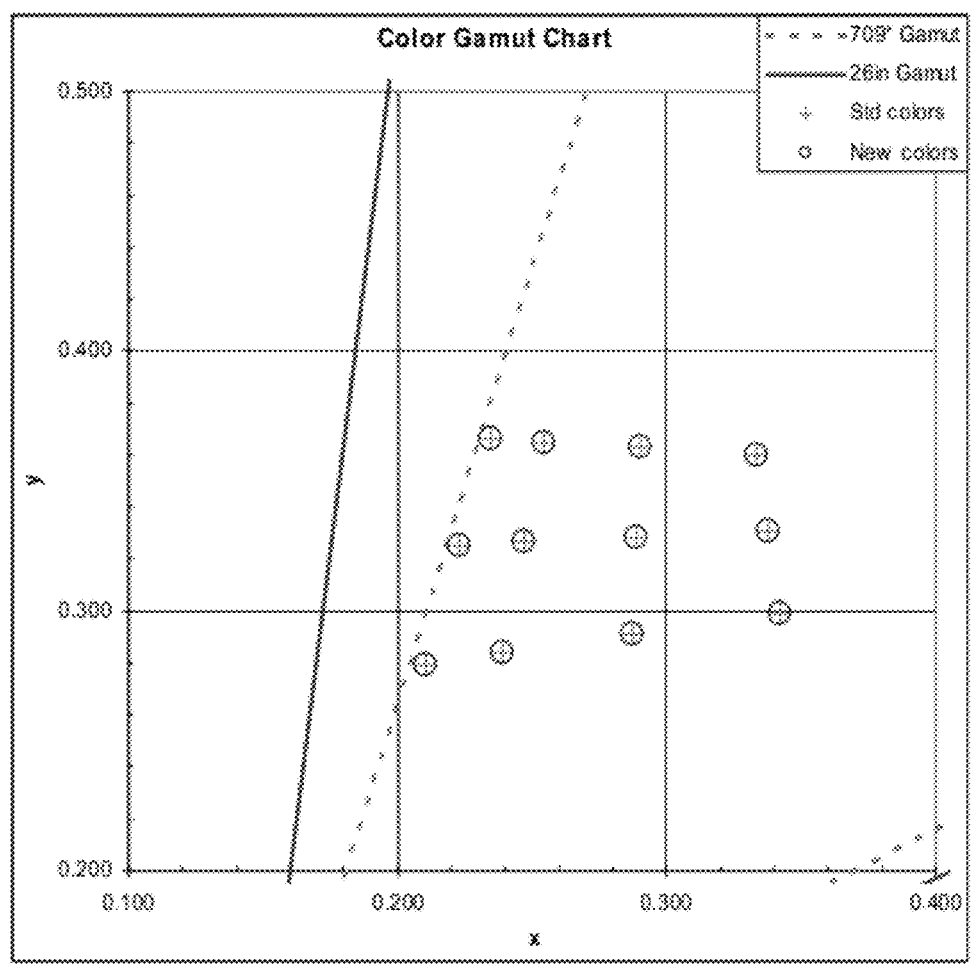

FIGS. 7A and 7B illustrate a detailed part of the color gamut chart in FIGS. 6A and 6B. FIGS. 7A and 7B shows x values ranging from 0.100 to 0.400 and y values ranging from 0.200 to 0.500. As is shown in FIGS. 7A and 7B, resultant colors match exactly those of the "standard" panel. The matching is illustrated by the superimposition of "□" on "◇."

This color and luminance adjustment method may be applied to any display device that creates images based on three primary colors. It may not be required that the colors be red, green and blue. Since this method modifies a display's color input signals, it can be applied to any transmissive, emissive, or projected display type including LCD, plasma, CRT, OLED, and DLP.

A sensor may be placed to keep the display calibrated to a color/luminance standard or a particular color gamut. The methods above may allow color change as an alternative or in addition to a color filter. The calculation methods may be implemented in a FPGA, ASIC or a microprocessor of any sort.

Figure 8:
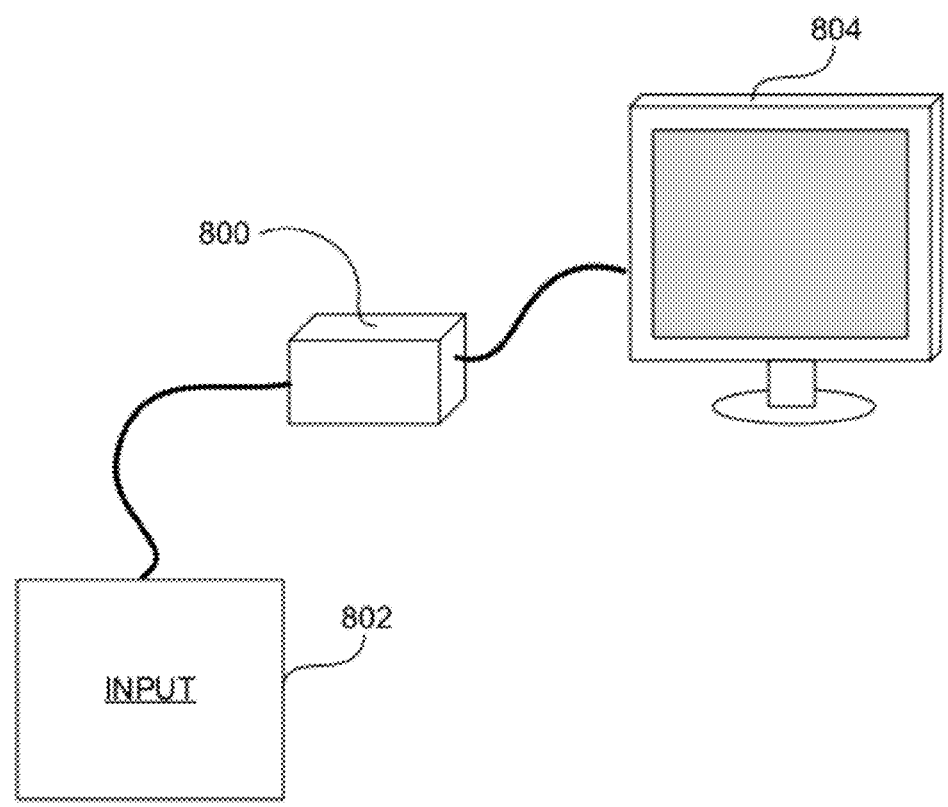
FIG. 8 is one embodiment of a color and luminance correction system.

FIG. 8 illustrates one embodiment of a color and luminance correction system. Correction device 800 can be configured to receive an input from input 802 and adjust the input to display a standardized color gamut (e.g., BT.709) to non-standard display 804. Correction device 800 can include hardware and input/output terminals to enable connection to a wide variety of input devices (e.g., cameras, video cameras, CT machines, MRI, etc, computer graphics cards) and to a wide variety of displays (e.g., CRT monitors, LCD monitors, LCD TV's, plasma TV's, etc, DLP displays, AMOLED displays). Additionally, correction device 800 can include hardware (such as CPU's, memory, power supplies, etc) and software or firmware configured to execute the formulas and method steps described above for color and luminance correction. In one embodiment of the color and luminance correction system, input 802 and display 804 are connected to correction device 800. If uncorrected, the color and luminance input received by correction device 800 from input 802 would provide a "non-standard" color on display 804. Thus, correction device 800 is configured to automatically and in real-time correct the input from input 802 to display a "standard" color scheme on display 804. The correction device 800 can include an input circuit configured to receive an input from input 802 and an output circuit configured to send an output to the display 804.

As for additional details pertinent to the present invention, materials and manufacturing techniques may be employed as within the level of those with skill in the relevant art. The same may hold true with respect to method-based aspects of the invention in terms of additional acts commonly or logically employed. Also, it is contemplated that any optional feature of the inventive variations described may be set forth and claimed independently, or in combination with any one or more of the features described herein. Likewise, reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

What is claimed is:

1. A method of displaying a standardized color gamut on a display, comprising:
   1) calculating a first set of luminances that would be produced on a first display when driven by a first set of input signals;
   2) calculating a first set of colors that would be produced on the first display when driven by the first set of input signals;
   3) calculating a second set of luminances that would produce the first set of colors calculated in step 2) on a second display by calculating an arithmetic product of (a) second display color gamut values and (b) arithmetic differences between first display output and second display luminance standards; and
   4) calculating a second set of input signals that would produce the second set of luminances calculated in step 3) on the second display when used as an input to the second display.

2. The method of claim 1 wherein the first display is a BT.709 display.

3. The method of claim 1 wherein the first display is a SMPTE-C display.

4. The method of claim 1 wherein steps 1 through 4 are performed in a controller.

5. The method of claim 4 wherein the controller is a separate piece of hardware from the second display.

6. The method of claim 1 wherein the first set of input signals comprise red, green, and blue input signals.

7. The method of claim 1 wherein the first set of luminances calculated in step 1 comprise a set of red, green, blue, and white luminances.

8. The method of claim 1, the first and second displays comprising a plurality of pixels, wherein steps 1-4 are repeated for each pixel in the second display.

9. The method of claim 1 wherein the first display is a standardized display and the second display is a non-standardized display.

10. A method of displaying a standardized color gamut on a display, comprising:
    receiving a first set of input signals in a controller;
    determining in the controller a first set of luminances and colors that would be produced on a first display with the first set of input signals;
    determining in the controller a second set of luminances that would produce the first set of colors on a second display by calculating an arithmetic product of (a) second display color gamut values and (b) arithmetic differences between first display output and second display luminance standards;
    generating in the controller a second set of input signals that would produce the second set of luminances on the second display; and
    outputting the second set of input signals to the second display.

11. The method of claim 10 wherein the first display is a BT.709 display.

12. The method of claim 10 wherein the first display is a SMPTE-C display.

13. The method of claim 10 wherein the first set of input signals comprise red, green, and blue input signals.

14. The method of claim 10 wherein the first set of luminances comprise a set of red, green, blue, and white luminances.

15. The method of claim 10, the first and second displays comprising a plurality of pixels, wherein each of the method steps are repeated for each pixel in the second display.

16. The method of claim 10 wherein the first display is a standardized display and the second display is a non-standardized display.

17. A system for transforming and displaying a video signal, comprising:
    a video signal source;
    an electronic display; and
    a controller comprising an input circuit configured to receive an input from the video signal source and an output circuit configured to send an output to the electronic display, the controller further comprising a processing circuit configured to:
    receive a first set of input signals from the video signal source; determine a first set of luminances and colors that would be produced on a target display with the first set of input signals, determine a second set of luminances that would produce the first set of colors on the electronic display by calculating an arithmetic product of (a) electronic display color gamut values and (b) arithmetic differences between first display output and second display luminance standards, generate a second set of input signals that would produce the second set of luminances on the electronic display, and output the second set of input signals to the electronic display.

18. The system of claim 17 wherein the electronic display is a BT.709 display.

19. The system of claim 17 wherein the electronic display is a SMPTE-C display.

20. The system of claim 17 wherein the first set of input signals comprise red, green, and blue input signals.

21. The method of claim 1 wherein the step of calculating an arithmetic product comprises calculating an arithmetic product of (a) second display color gamut values and (b) arithmetic differences between first display output and second display red, green and blue luminance standards.

22. The method of claim 10 wherein the step of calculating an arithmetic product comprises calculating an arithmetic product of (a) second display color gamut values and (b) arithmetic differences between first display output and second display red, green and blue luminance standards.

23. The system of claim 17 wherein the controller further comprises a processing circuit configured to determine a second set of luminances that would produce the first set of colors on the electronic display by calculating an arithmetic product of (a) electronic display color gamut values and (b) arithmetic differences between first display output and second display red, green and blue luminance standards.

* * * * *